United States Patent Office 3,380,566
Patented Apr. 30, 1968

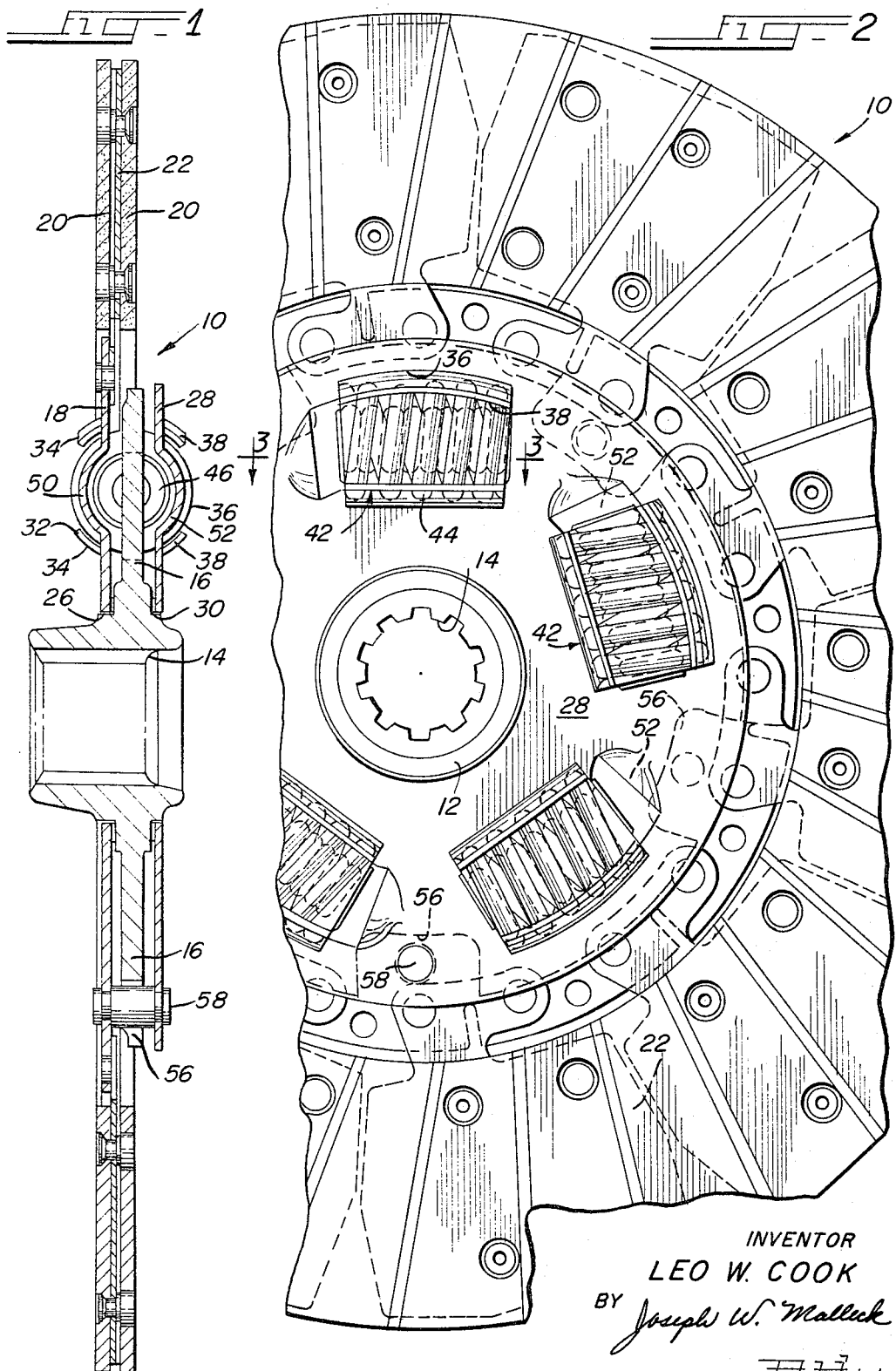

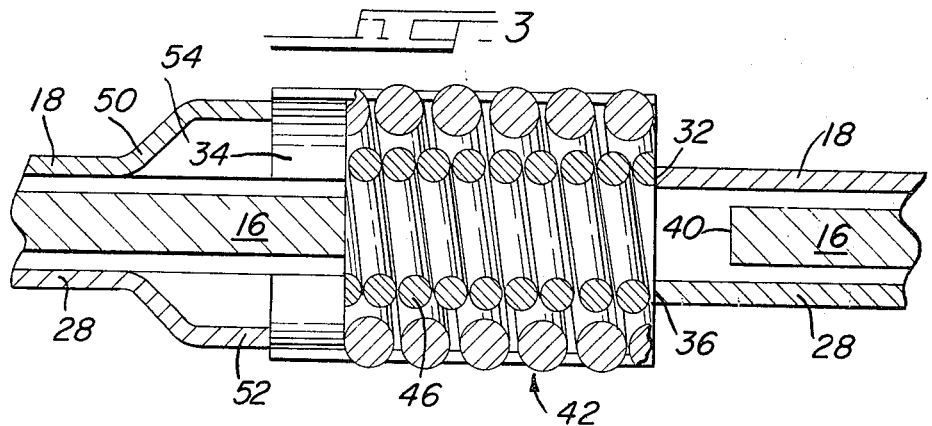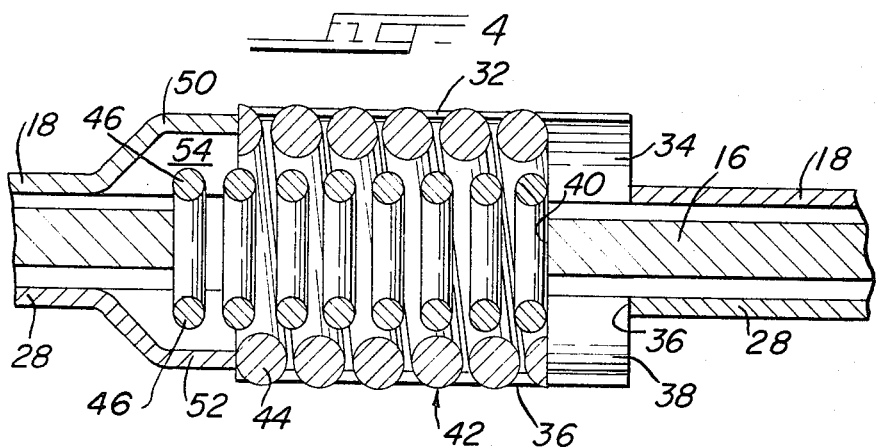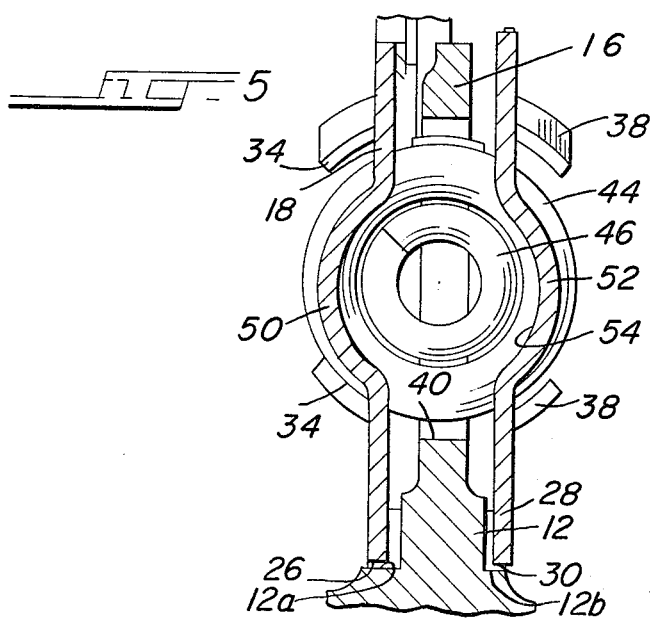

3,380,566
FRICTION PLATE EMPLOYING
VIBRATION DAMPER
Leo W. Cook, Royal Oak, Mich., assignor to Borg-Warner
Corporation, Chicago, Ill., a corporation of Illinois
Filed Dec. 30, 1965, Ser. No. 517,532
6 Claims. (Cl. 192—107)

ABSTRACT OF THE DISCLOSURE

A vibration damper utilizes sets of aligned apertures in relatively rotatable members with provision made for the edges of the aligned apertures to position concentric nested coil spring members such that all spring members are engaged simultaneously on the application of drive torque and the inner coil springs are engaged at a time later than the outer coil spring on the application of a coast torque to the vibration damper assembly.

---

This invention relates to power-stop mechanisms and more particularly to a clutch of the friction-disc type having novel vibration dampening means.

Heretofore, automotive vehicle clutches have embodied vibration dampening means in the clutch driven plate which comprise in its simplest embodiment a hub having a radial flange surrounded on one side by a friction disc and on the other side by a drive washer. These elements were formed with circumferentially spaced groups of registering apertures within which was constrained resilient means generally taking the form of a compression spring. Improvements were made in this type of vibration dampening means to include more than one helical compression spring in each aperture group to achieve greater vibration dampening without increasing the size of the driven plate. Structures of that general type are illustrated in U.S. Patent 2,920,733, Daniel W. Lysett, January 12, 1960; U.S. Patent 3,101,600, Clinton V. Stromberg, August 27, 1963; and U.S. Patent 3,138,039, Reinhold C. Zeidler et al., June 23, 1964.

One disadvantage of the clutches illustrated in the cited patents is that the spring assemblies operate at the same rate in each condition of rotation, i.e., the normal drive condition in which the friction disc rotates the flange and in the coast condition in which the flange rotates at a higher rate than the friction disc. Drive is transmitted from the flange to the friction disc while the vehicle is coasting as when gears are shifted in a downhill condition. It is advantageous to have a clutch having a relatively high spring rate in drive condition and a relatively low spring rate in coast condition.

Accordingly, a principal object of the invention is to provide a clutch device comprising a driven plate having vibration dampening means characterized by a relatively high spring rate providing vibration dampening in drive condition and a relatively low spring rate providing vibration dampening in the coast condition.

Another object of the invention is to provide a clutch mechanism of the stated type in which each spring assembly includes an outer spring and an inner spring and in which both springs are operative to effect vibration dampening in the drive condition and in which only one of the springs in each assembly is effective to dampen vibrations in the coast condition.

These and other objects of the invention will become apparent as the description proceeds with reference to the accompanying drawings wherein:

FIGURE 1 is a vertical sectional view of a clutch driven plate made in accordance with the present invention;

FIGURE 2 is an end view of the clutch of the driven plate of FIGURE 1;

FIGURE 3 is an enlarged sectional view taken substantially on line 3—3 of FIGURE 2, showing the spring assembly elements in the position they assume with full drive travel;

FIGURE 4 is a view similar to FIGURE 3 but showing the spring assembly elements in the position they assume with full coast travel; and, FIGURE 5 is an enlarged fragmentary sectional view of a detail of FIGURE 1.

Referring now to the drawings, and more particularly to FIGURES 1 and 2, the clutch driven member of the present invention is indicated generally by reference numeral 10 and includes a hub 12 having a central splined opening 14 extending therethrough and provided with an integral annular flange 16 extending radially outwardly therefrom. The clutch driven member or assembly further includes disc 18 formed of sheet metal and disposed in a manner to be spaced on one side from flange 16; the disc 18 is illustrated as carrying a plurality of circumferentially spaced and radially outwardly extending spring cushions 22 riveted to the outer periphery of the disc 18; the spring cushions 22 in turn carry annularly arranged friction facings 20 on opposite sides thereof adapted to be packed between driving members in a conventional clutching manner. The disc 18 has a central opening 26 defined by an opening periphery which is radially spaced from a shoulder 12a formed integrally on the hub 12 at one side of the flange 16. A drive washer or disc 28 formed from sheet metal is positioned on the opposite side of the flange 16 in spaced relationship thereto and also has a central opening 30 (axially aligned with the opening 26 or disc 18) which is defined by an opening periphery spaced from the shoulder 12d of the hub 12 at the outer side of the flange 16.

The disc 18 is formed with a plurality of circumferentially spaced openings or windows 32 defined in part by outwardly extending arcuate flanges 34 at the radially outer and inner peripheries of the opening. In like manner, the drive washer or disc 28 is formed with a plurality of circumferentially spaced apertures 36 which are disposed in axial register with the apertures 32 (when viewed in the direction parallel to the axis of rotation) and are defined in part by outwardly extending arcuate flanges 38 at the radially outer and inner peripheries of the openings. The flange 16 also is formed with a plurality of circumferentially spaced arcuate openings 40 in alignment with the apertures 32 and 36 to form a registering aperture group in each of which is received a spring assembly indicated, generally by the reference 40. (Further detail construction of the registering aperture groups may be gained by reference to U.S. Patent 2,276,416.)

Each spring assembly 42 includes an outer helical compression spring 44 and an inner helical compression spring 46. The arcuate flanges 34 and 38 serve the function of retaining the spring assemblies in the operative relation illustrated.

In operation, vibrations originating in the vehicle engine are dampened by the resilient relative movement between the disc 18 and the drive washer 28 moving, as a unit, with respect to the flange 16. According to an important feature of the present invention the present driven plate has relatively high spring rate providing vibration dampening characteristics when rotated in drive condition, as illustrated in FIGURE 3, and relatively low spring rate providing vibration dampening characteristics when driven in the coasting condition, as illustrated in FIGURE 4.

According to the present invention, the disc 18 is formed with a plurality of outwardly extending arcuate protuberances 50 adjacent each of the openings 32 and in like manner the drive plate 28 is formed with an outwardly extending arcuate protuberance 52 adjacent each of the openings 36. The protuberances 50 and 52 cooperate to form a pocket indicated by reference numeral 54. It will be noted that the radius of formation of the protuberances 50 and 52 coincides with the convolutions of the spring 44.

In drive condition, the driven plate 10 rotates in a counterclockwise direction, as viewed in FIGURE 2. Referring now to FIGURE 3, in this condition, drive is imparted to the springs 44 and 46 simultaneously by the right edge of the friction disc 18 defining the opening 32 and the right edge of the drive washer 28 defining the opening 36. The springs 44 and 46 are in abutment with the left edge of the flange 16 defining the opening 40 and drive is imparted to the flange 16 in this manner.

In the coast condition, the flange 16 is rotated relative to the disc 18 and the washer 28 and thus forces the spring assembly 42 to the left, as illustrated in FIGURE 4. The left end convolution of the spring 44 is urged into abutment with the confronting edges of the protuberances 50 and 52 while the left convolution of the spring 46 remains in engagement with the left edge of the flange 16 defining the opening 40 and the left end of the spring 46 is moved into the pocket 54. Drive is then transmitted from the flange 16 to the disc 18 and the drive washer 28 through the spring 44 only. Thus, the spring rate providing vibration dampening in the condition in which the speed of the flange 16 exceeds that of the friction disc 18 is at a relatively low rate as compared to the spring rate during drive condition as illustrated in FIGURE 3, in which both the spring 44 and the spring 46 are operative.

The outer periphery of the flange 16 is provided with a plurality of circumferentially spaced slots 56, see FIGURE 2. Extending through the slots 56 are stop pins 58, which, as illustrated in FIGURE 1, secure the disc 18 and the washer 28 for conjoint rotation. In the rest condition of the driven plate 10, the stop pin 58 assumes a position midway between the edges of the slot 56 so as to permit equal relative rotation between the disc 18 and the flange 16. In this rest condition the end convolution springs 44 and 46 are in rubbing engagement with the edges of the openings in the disc 18, the flange 16 and the washer 28. It will be appreciated that the left convolution, as viewed in FIGURES 3 and 4, of the spring 44 are in rubbing engagement with the right edges of the protuberances 50 and 52.

The clutch device of the present invention exhibits important advantages over the clutch devices of this type heretofore known. For example, the relative low spring rate of the spring 44 is particularly advantageous for vibration occuring under coasting conditions. In the drive condition the relatively high spring rate of the springs 44 and 46 affords efficient dampening of vibrations incident due to torque characteristics of a prime mover. Also, the dampening rate in both the coast and drive conditions may be varied by changing the spring load of the springs 44 and 46 as required. The driven plate of the present invention affords approximately 8½° angular travel in either the drive or coast condition as compared with only 6½° travel in prior art driven plates having six spring assemblies rather than five as in the present invention.

I claim:

1. In a clutch device, the combination comprising a hub having an integral annular flange projecting radially therefrom, a friction disc supported on said hub at one side of said flange, a drive washer supported on said hub at the other side of said flange, means defining a plurality of registered groups of apertures in said flange, said friction disc and said drive washer, the apertures of said flange being in register with the apertures of said friction disc and said drive washer; resilient means disposed within at least one of said registered groups of apertures adapted to transmit drive from said friction disc to said hub flange and vice versa, comprising a first outer resilient member having a first end and a second end and a second inner resilient member having a first end and a second end and being concentrically disposed within said first resilient member, and means formed integrally in said friction disc and said drive washer providing a drive means for said first end of said outer resilient member and said first end of said inner resilient member whereby said first end of said outer resilient member is generally radially aligned with said first end of said inner resilient member and a drive means for said second end of said outer resilient member and said second end of said inner resilient member whereby said second end of said outer resilient member is engaged prior to the time said second end of said inner resilient member.

2. A clutch in accordance with claim 1 wherein said last-named means comprises at least one pocket formed in said friction disc and said drive washer adjacent one of said aperture groups, said pocket being adapted to receive said second resilient member upon rotation of said flange in said opposite direction.

3. A clutch in accordance with claim 1 wherein said last-named means comprises at least one pocket formed in said friction disc and said drive washer adjacent said aperture group, the edges of said friction disc and said drive washer defining said pocket being operative to engage said first resilient member and said second resilient member being formed into said pocket in a condition of operation in which said flange drives said friction disc, said second resilient member being received in said pocket.

4. A clutch in accordance with claim 1 wherein both of said resilient members are operative in the normal drive condition in which drive is imparted to said flange by said friction disc and in which only one of said resilient members is operative in the coast condition in which drive is imparted from said flange to said friction disc.

5. In a clutch device, the combination comprising a hub having an integral annular flange projecting radially therefrom, a friction disc supported on said hub at one side of said flange, a drive washer supported on said hub at the other side of said flange, means defining a plurality of registered groups of apertures in said flange, said friction disc and said drive washer, the apertures of said flange being in register with the apertures of said friction disc and said drive washer; resilient means disposed within said registered groups of apertures adapted to transmit drive from said friction disc to said hub flange and vice versa, each of said resilient means comprising a first resilient member having a first end and a second end and a second resilient member having a first end and a second end disposed within said first resilient member, and means formed integrally in said friction disc and said drive washer providing a first surface to engage said first end of said outer resilient member and a second surface to engage said first end of said inner resilient member such that said first surface and said second surface are generally radially aligned and providing a third surface to engage said second end of said outer resilient member and a fourth surface to engage said second end of said inner resilient member such that said third surface and said fourth surface are displaced with respect to each other.

6. A clutch in accordance with claim 5 wherein said last-named means comprises a pocket formed in said friction disc and said drive washer adjacent each of said aperture groups for reception of said second resilient member.

References Cited

UNITED STATES PATENTS 2,574,573  11/1951  Libby _____ 192—68 X
2,920,733  1/1960  Lysett _____ 192—107

DONLEY J. STOCKING, *Primary Examiner.*

ARTHUR T. McKEON, *Examiner.*